Patented July 7, 1925.

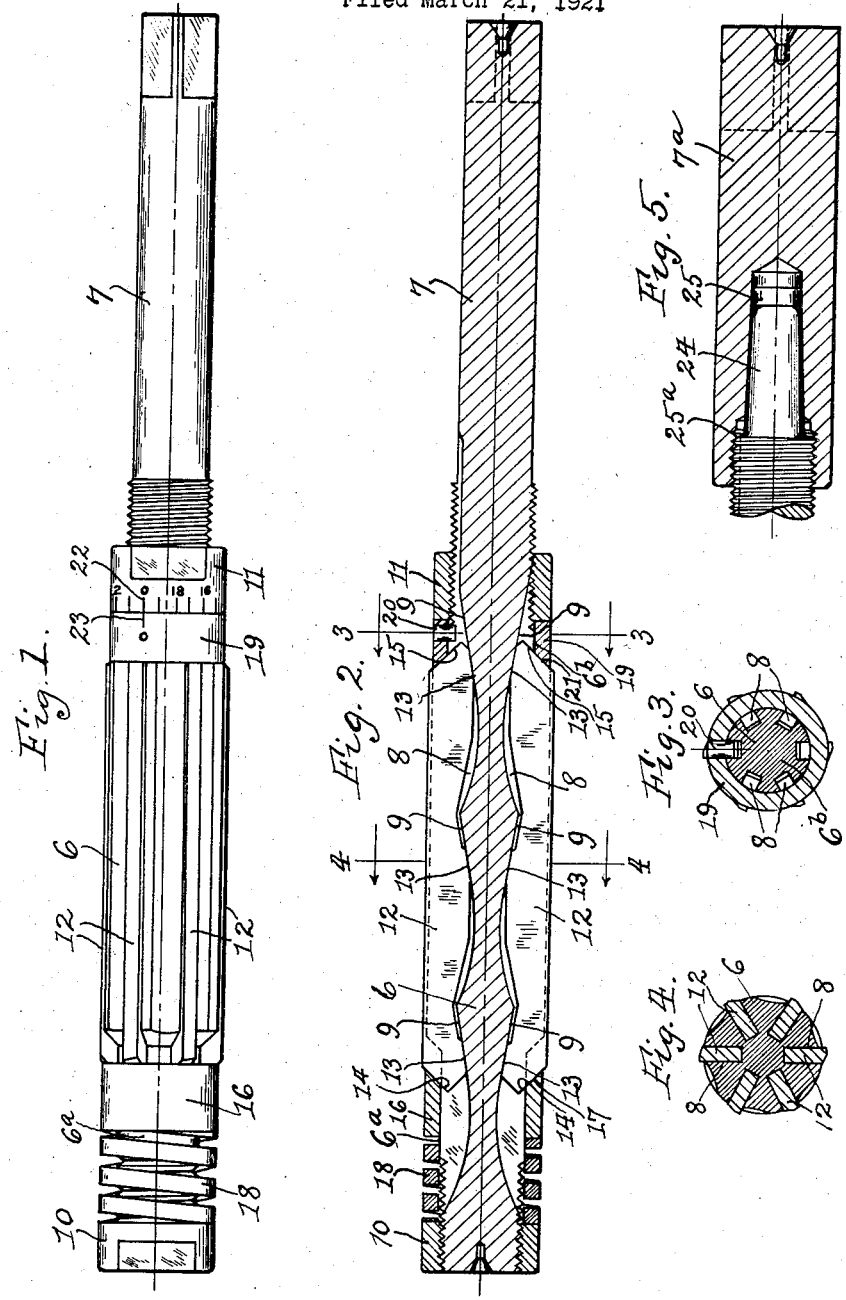

1,544,656

UNITED STATES PATENT OFFICE.

OSKAR KYLIN, OF ELKHART, INDIANA.

ADJUSTABLE REAMER.

Application filed March 21, 1921. Serial No. 454,251.

*To all whom it may concern:*

Be it known that I, OSKAR KYLIN, a citizen of the United States, residing at Elkhart, in the county of Elkhart and State of Indiana, have invented certain new and useful Improvements in Adjustable Reamers, of which the following is a specification.

This invention relates to adjustable reamers, and has reference more particularly to adjustable reamers of the type designed and adapted to line-ream the wrist-pin holes in pistons, but adapted to be used with equal advantage for reaming any kind of a hole.

My present invention embodies the same broad principle for effecting expansion and contraction of the reamer blades as that disclosed in a former application filed by me on the third day of January, 1921, Serial No. 434,496; but embodies certain improvements on the structure of the aforesaid application by which the number of parts is considerably reduced, and the structure is otherwise simplified.

In order that the invention may be clearly understood, I have illustrated the structural features thereof in the accompanying drawing, wherein—

Fig. 1 is an elevation of the complete tool;

Fig. 2 is a longitudinal axial section of the same;

Figs. 3 and 4 are cross sections on the line 3—3 and 4—4, respectively of Fig. 2; and Fig. 5 is a fragmentary axial section, showing a modification wherein the stem or shank of the reamer is separable from the body.

Referring to the drawings, 6 designates as an entirety the body of the reamer which, as shown in Figs. 1 to 4, is formed with a continuous or integral stem or shank 7. The body of the reamer is provided with a series, herein shown as six in number, of equally spaced longitudinal radial slots 8, and the bottom wall of each slot is formed with a series, herein shown as three, of inclined cam surfaces 9 which are integral with the body. The end portions $6^a$ and $6^b$ of the body are of reduced diameter, as best shown in Fig. 2, and the end portion $6^a$ is threaded to receive an adjusting nut 10, and the inner end of the stem or shank 7 is likewise threaded to receive an adjusting nut 11. Within the slots 8 are located the reamer blades 12. Each of these blades is formed on its inner edge with cam surfaces or seats 13 which cooperate with the cam surfaces 9 formed on the bottom walls of the blade slots. Each blade is also formed at its outer end with an inclined cam seat 14, and at its inner end with an oppositely inclined seat 15.

On the reduced outer end $6^a$ of the body is slidably mounted a collar 16 formed on its inner end with a cam 17 which engages with the cam seats 14 of the blades, and between the collar 16 and the adjusting nut 10 is a coil compression spring 18, the action of which is to force the blades 12 endwise through the collar 16 and cause said blades to be expanded radially of the body by riding up on the cam surfaces 9 of the slot bottoms. Slidably mounted on the reduced end $6^b$ of the body is another collar 19 which is splined thereon by means of a radial pin 20 engaged with one of the blade slots 8. This collar 19 lies between the adjusting nut 11 and the adjacent end of the blades, and on its inner end is formed with a cam seat 21 which cooperates with the cam seats 15 of the blades. When the nut 11 is turned up, the collar 19 cooperates with the spring pressed collar 16 to retract the blades inwardly of their slots. The collar 11 is provided with a micrometer scale 22 which cooperates with an index line 23 on the collar 19 to measure the amount of blade adjustment.

The manner of adjusting the blades is readily apparent from the foregoing description of the structure. The spring 18 is at all times under compression, so that the cooperating cam seats 14 and 17 at one end and 15 and 21 at the other hold the blades rigidly in fixed position. To adjust the blades outwardly, the nut 11 is turned backwardly, allowing the spring 18, acting through the collar 16 to force the blades endwise and cause them to ride up on the cams 9. To retract the blades inwardly, the nut 11 is turned forwardly and, through the collar 19, forces the blades endwise in the opposite direction causing them to ride down the cams 9 under the inward thrust of the cam seats on the ends of the blades and on the ends of the collars, this action at the same time increasing the thrust of the spring 18. The working thrust of the latter may be nicely regulated at any time by manipulation of the adjusting nut 10.

In Fig. 5 I have shown a slightly modified construction which employs a stem or shank 7ª that is separable from the body of the reamer. In this construction the outer end of the body beyond the threaded portion which receives the nut 11 is formed as a tapered shank 24 which fits a correspondingly tapered socket 25 in the tool shank or stem 7ª, and the outer portion of the socket 25 is enlarged and tapped as shown at 25ª for threaded engagement with the threaded portion of the body.

The tool herein described has been designed as a general purpose adjustable hand reamer of simple and inexpensive construction and requiring only one adjusting nut for both expanding and contracting the reamer blades. The amount of adjustment can be read off directly by means of the micrometer graduations 22 on the adjusting nut 11, and the large diameter of the reamer body affords rigid support for the blades in the slots. The tool provides ample chip clearance, the properly dimensioned helical spring 18 affords ease and accuracy of adjustment and by reason of its flexibility the reamer will produce a very superior finish in the hole. To provide a tool possessing the desirable characteristics above mentioned has been the chief object and aim of the present invention.

I claim:

1. In an adjustable reamer, the combination of a body having a plurality of longitudinal blade slots, the bottom of each of said blade slots being formed into a plurality of longitudinally inclined cam surfaces integral with said body, blades arranged in said slots and adapted for outward and inward movement, cam means for moving said blades inwardly, means for moving said cam means longitudinally of said body, and spring pressed cam means cooperating with said inclined cam surfaces to move said blades outwardly.

2. In an adjustable reamer, the combination of a body having a plurality of blade slots, the bottom of each being formed into a plurality of longitudinally inclined cam surfaces integral with said body, blades arranged in said slots and adapted for outward and inward movement, a cam collar slidably mounted on said body and engaged with said blades to move the latter inwardly, a nut mounted on said body and adapted to force said cam collar against one end of said blades, a spring pressed cam collar slidably mounted on said body and engaged with the other end of said blades and serving, in cooperation with said inclined cam surfaces to move said blades outwardly.

3. In an adjustable reamer, the combination of a body having a plurality of blade slots, the bottom of each of said blade slots being formed into a plurality of longitudinally inclined cam surfaces integral with said body, blades arranged in said blade slots and formed with cam surfaces on their inner edges engaged with said inclined cam surfaces in said blade slots, cam means for moving said blades inwardly, means for moving said cam means longitudinally of said body, and spring pressed cam means cooperating with the cam surfaces on the bottoms of said slots to move said blades outwardly.

4. In an adjustable reamer, the combination of a body having a plurality of longitudinally blade slots, each having its bottom formed into a plurality of longitudinally inclined cam surfaces integral with said body, a plurality of outwardly and inwardly movable blades formed with cam seats at both ends, a longitudinally movable collar splined on said body and formed with a cam seat on its inner end and adapted to actuate said blades inwardly, means for forcing said collar against said blades, and a spring pressed collar sleeved on said body and formed on its inner end with a cam engaged with the cam sheets on one end of said blades, whereby, through the pressure of said spring-pressed collar acting through said cam, cam seats and cam surfaces, said blades are actuated longitudinally and outwardly.

5. In an adjustable reamer, the combination of a body having a plurality of longitudinal blade slots each having its bottom formed into a plurality of longitudinally inclined cam surfaces integral with said body, a plurality of outwardly and inwardly movable blades formed with cam seats on their ends and cam surfaces on their inner edges, a longitudinally movable collar splined on said body and engaging cam seats on one end of said blades, means for forcing said collar against said blades, a second collar sleeved on said body and engaging the cam seats at the other end of said blades, and a spring backing said second collar and adapted to be compressed by the longitudinal movement of the first collar, said spring and said second collar being adapted to force said blades outwardly when the reamer is inserted in a hole and when said first collar is moved away from said blades so as to allow an outward movement of the latter.

6. In an adjustable reamer, the combination of a body having a plurality of longitudinal blade slots each having its bottom formed into a plurality of longitudinally inclined cam surfaces integral with said body, a plurality of outwardly and inwardly movable blades formed with cam seats on their ends and cam surfaces on their inner edges, a longitudinally movable collar splined on said body and engaging the cam seats on one end of said blades, a nut on said body behind said collar for forcing the latter against said blades, a second collar sleeved on said body and engaging the cam seats at the other end of said blades, a coil spring behind said last-named collar, and a nut on the end of said body behind said spring and constituting an adjustable abutment for the latter.

OSKAR KYLIN.